United States Patent
Reynolds

(10) Patent No.: US 7,093,563 B1
(45) Date of Patent: Aug. 22, 2006

(54) PROTECTIVE ENTRANCE DEVICE FOR BIRDHOUSES

(76) Inventor: Patricia E. Reynolds, 260 E. Chestnut St., Suite 2105, Chicago, IL (US) 60611

( * ) Notice: Subject to any disclaimer, the term of this patent is extended or adjusted under 35 U.S.C. 154(b) by 0 days.

(21) Appl. No.: 11/157,511

(22) Filed: Jun. 21, 2005

(51) Int. Cl.
- A01K 31/00 (2006.01)
- A01K 31/12 (2006.01)
- A01K 1/00 (2006.01)

(52) U.S. Cl. .............. 119/428; 119/468; 119/57.9

(58) Field of Classification Search ............. 119/428, 119/429, 430, 531, 537, 52.2, 52.3, 57.8, 119/57.9, 468
See application file for complete search history.

(56) References Cited

U.S. PATENT DOCUMENTS

| | | | | |
|---|---|---|---|---|
| 1,169,409 A | * | 1/1916 | Larson | 119/428 |
| 2,077,208 A | * | 4/1937 | Brady | 119/430 |
| 2,681,038 A | * | 6/1954 | Clark | 119/430 |
| 3,017,858 A | * | 1/1962 | Brown | 119/428 |
| 3,049,093 A | * | 8/1962 | Oliver | 119/57.9 |
| 3,191,579 A | * | 6/1965 | Oliver | 119/57.8 |
| 3,505,975 A | * | 4/1970 | Nelson, Jr. et al. | 119/429 |
| 3,960,111 A | * | 6/1976 | Harris et al. | 119/428 |
| 3,960,112 A | * | 6/1976 | Tiller | 119/57.8 |
| 4,166,432 A | * | 9/1979 | Moore | 119/430 |
| 4,173,200 A | * | 11/1979 | Olsen et al. | 119/428 |
| 4,235,196 A | * | 11/1980 | Moliterni | 119/464 |
| 4,239,021 A | * | 12/1980 | Moore | 119/430 |
| 4,242,983 A | * | 1/1981 | Moore | 119/430 |
| 4,561,383 A | * | 12/1985 | Tidwell | 119/435 |
| 4,846,110 A | * | 7/1989 | Reynolds | 119/428 |
| 5,215,039 A | * | 6/1993 | Bescherer | 119/57.8 |
| 5,881,675 A | * | 3/1999 | Shaffer | 119/430 |
| D428,675 S | * | 7/2000 | Kokernot et al. | D30/128 |

* cited by examiner

Primary Examiner—Yvonne R. Abbott
(74) Attorney, Agent, or Firm—Wood, Phillips, Katz, Clark & Mortimer

(57) ABSTRACT

A protective device for limiting access through an opening formed in one wall of a house for small animals or birds, including an elongated open-ended tubular body having first and second ends and a passage therethrough, a securement for securing the first end of the tubular body to the house, and a support structure extending downwardly from the second end of the tubular body. The support structure includes a perch substantially aligned with the tunnel and extending at least about 0.75 inches from the second end of the tubular body, and/or the top of the second end of the tubular body is recessed toward the one end.

13 Claims, 1 Drawing Sheet

PROTECTIVE ENTRANCE DEVICE FOR BIRDHOUSES

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to protective devices for animal houses, and more particularly, to birdhouse adjuncts and attachments for inhibiting the access of preying animals into birdhouses and similar structures.

BACKGROUND OF THE INVENTION AND TECHNICAL PROBLEMS POSED BY THE PRIOR ART

The variety of birdhouses and similar animal shelters that exist is indicative of the number of people whose love of animals takes the form of providing various shelters and food for nature's creatures. Birdhouses are among the most popular and common forms of such shelters.

Such structures provide shelter for a variety of creatures. For example, birdhouses are designed for a variety of different birds, determined, in part, by the size and shape of the houses themselves, and by the sizes of the access openings or entrance holes into the houses.

Unfortunately, birds and the nests, even when in these houses, are often subject to attack by other larger, preying animals, such as, for example, squirrels, or racoons, or even larger birds. While such animals may not be able to enter the entrance holes of birdhouses designed for smaller birds, they often have the ability to reach their heads, paws, or claws into the house and damage the nest and/or the eggs, or harm baby birds within the house. When this occurs, not only is the damage irreparable, but any bird who had taken to nesting in the house or who otherwise perceives the danger evident from the damage will be unlikely to thereafter use the house. Therefore, while the birdhouse may itself appear essentially undamaged, the owner may lose the pleasures of watching birds use the house.

Birdhouse access openings or entrance holes must be of a certain size in order to permit access to the birds for which they are designed. The diameters of entrance holes typically range in size between about one inch and about two and one-half inches. However, while many entrance holes are relatively small, they are large enough to permit some access to attacking or other unwanted creatures. As a result, it is desirable to be able to protect the birds inside the house, particularly baby birds during the days immediately after birth when they are most at peril and risk, while simultaneously providing for convenient and ready access to the birds for which the houses are designed.

Applicant's own U.S. Pat. No. 4,846,110 addressed this by providing a tubular tunnel member which is secured over the opening to the birdhouse. While this structure works very well in protecting the birdhouse from larger predators being able to reach into the house, the tunnel also may deter some smaller birds (which the birdhouse owner wishes to use the house) from even attempting entry. This may be particularly true when a new bird wishes to first inspect the house but does not do so because of a sense of danger at the entrance to the tunnel.

The present invention is directed toward overcoming one or more of the problems set forth above.

SUMMARY OF THE INVENTION

In one aspect of the present invention, a protective device for limiting access through an opening formed in one wall of a house for small animals or birds is provided, including an elongated open-ended tubular body having first and second ends and a passage therethrough, a securement for securing the first end of the tubular body to the house, and a support structure extending downwardly from the second end of the tubular body. The support structure includes a perch substantially aligned with the tunnel and extending at least about 0.75 inches from the second end of the tubular body.

In one form of this aspect of the present invention, the top of the second end of the tubular body is recessed toward the first end. In a further form, the top of the second end of the tubular body is recessed toward the first end by about 0.25 inch.

In another form of this aspect of the present invention, the tubular body is generally cylindrical in cross-section.

In still another form of this aspect of the present invention, the tubular body has a length sufficient to impede access to the interior of the enclosure of creatures too large to pass through the tubular body passage.

In yet another form of this aspect of the present invention, the tubular body passage corresponds generally to the shape and dimension of the wall opening in the house.

In another aspect of the present invention, a protective device for limiting access through an opening formed in one wall of an enclosure for small animals or birds is provided, including an elongated open-ended tubular body having first and second ends and a passage therethrough, a securement for securing the first end of the tubular body to the enclosure wall, and a support structure extending downwardly and outwardly from the second end of the tubular body. The top of the tubular body above the second end from which the support structure extends is recessed toward the first end.

In one form of this aspect of the present invention, the top of the second end of the tubular body is recessed toward the first end by about 0.25 inch.

In another form of this aspect of the present invention, the tubular body is generally cylindrical in cross-section.

In still another form of this aspect of the present invention, the tubular body has a length sufficient to impede access to the interior of the enclosure of creatures too large to pass through the tubular body passage.

In yet another form of this aspect of the present invention, the tubular body passage corresponds generally to the shape and dimension of the wall opening in the house.

In still another aspect of the present invention, a protective device for limiting access through an opening formed in one wall of a house for small animals or birds is provided, including an elongated open-ended tubular body having a house end and an outer end and a passage therethrough, a securement for securing the house end of the tubular body to the house, and a support structure extending downwardly and outwardly from the outer end of the tubular body. The support structure includes a lower outer end which is at least about 25° from vertical in a vertical plane from the outer end of the bottom of the passage.

In one form of this aspect of the present invention, the top of the outer end of the tubular body is recessed toward the house end. In a further form, the top of the outer end of the tubular body is recessed toward the house end by about 0.25 inch

DETAILED DESCRIPTION OF THE INVENTION

The present invention is an improvement upon my own U.S. Pat. No. 4,846,110 and commercial embodiment sold under my Bird Guardian® trademark. The full disclosure of U.S. Pat. No. 4,846,110 is hereby incorporated by reference.

Figure 1:
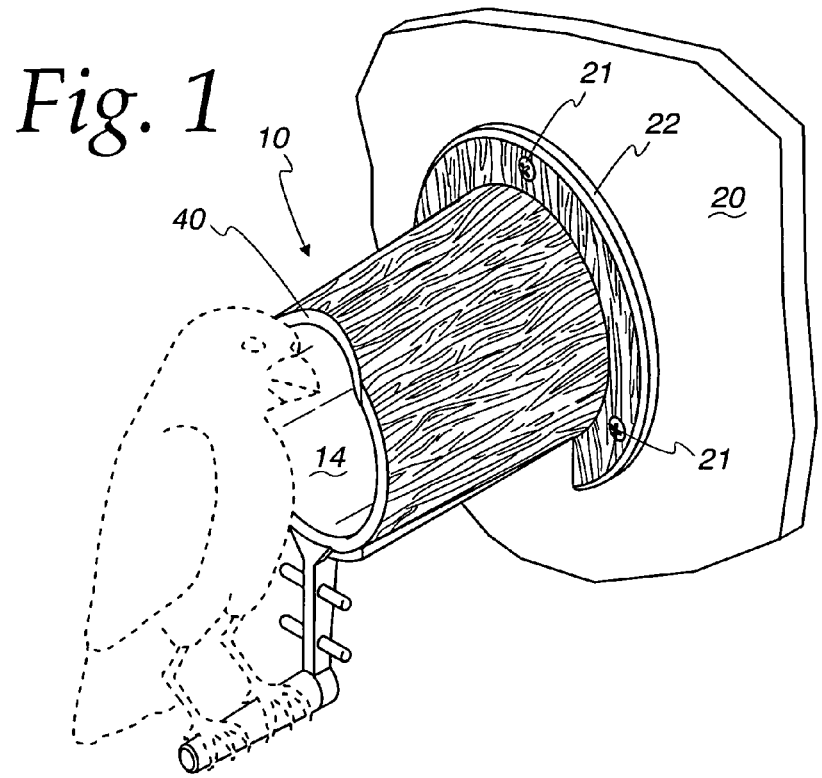
FIG. 1 is a perspective view of a birdhouse entrance according to the present invention, with a bird shown in phantom.
Figure 2:
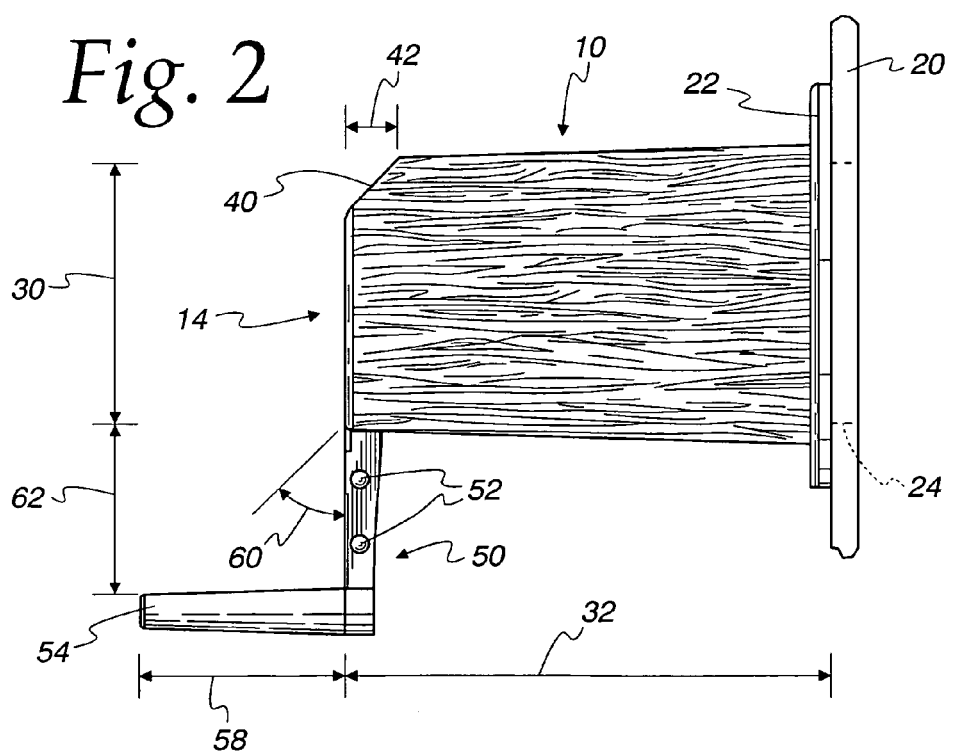
FIG. 2 is a side view of the birdhouse entrance of FIG. 1.

As illustrated in FIGS. 1–2, the birdhouse entrance 10 includes a tunnel 14 defining a cylindrical passage therethrough which is securable in a suitable manner on one end to a birdhouse 20 with the tunnel aligned with, and generally conforming in size and shape to, the entrance 24 to the birdhouse 20. Such securement may be accomplished by, for example, screws 21 through a flange 22 around the end of the entrance 10. However, it should be understood that a wide variety of structures for securing the entrance 10 to the birdhouse 20 could be used within the scope of the present invention, including suitable glue or adhesive, or a structure such as illustrated in my U.S. Pat. No. 4,846,110.

While it would be within the broad scope of the invention to provide a tunnel 14 of different and/or varying diameters, in a preferred embodiment the tunnel 14 defines a tubular opening having an inner diameter of about 1.5 inches. This diameter is sufficiently large for desired birds such as bluebirds to pass through the tunnel 14 while preventing larger undesirable predator birds from entering the birdhouse 20 through the entrance 10.

Additionally, while the length 32 of the tunnel 14 may also vary within the scope of the invention, it has been found that a length 32 of at least about 2.5 inches is desirable to prevent predator animals such as racoons from being able to reach into the birdhouse with their front legs.

At the outer end of the tunnel 14, the top wall is recessed at 40 (or conversely the lower portion of the tunnel 14 projects outwardly) a distance 42 of at least 0.25 inch. As a result of this configuration, whereby the top wall of the tunnel 14 does not extend as far out from the birdhouse as the bottom wall, birds may more comfortably approach and inspect the tunnel entrance as they may comfortably perch there and initially look into the tunnel without having to stick their head into the tunnel. This provides the bird with some vision around the area while investigating the tunnel 14, both allowing the bird the comfort of some visual warning should some danger such as a predator approach and also allowing the bird to initially investigate the tunnel without being scared away at that uncertain stage by feeling trapped as can occur if such inspection would force the bird to stick its head into the tunnel 14. As a result, birds are more likely to check the entrance, develop a safe feeling about it, and then ultimately are more likely to fully enter the birdhouse 20 through the entrance 10 and establish a protected home in the birdhouse 20 as the birdhouse owner desires.

Moreover, in addition to the recessed upper tunnel wall 40, in accordance with the present invention, a downwardly extending support 50 is secured beneath the tunnel 14. Laterally extending pegs 52 may be provided on opposite sides of the support 50, and a perch 54 extends outwardly for a distance 58 of at least about 0.75 inch. Such a perch 54 allows desired birds who approach the birdhouse 20 to stand thereon as illustrated in phantom in FIG. 1, with a body position which allows the bird to feel safe because it is readily able to quickly take flight if danger is detected. It does not cause the bird to face into the tunnel (as could tend to occur should the bird rest on the pegs 52), and therefore the bird is able to rest in this sideways position, with its view essentially unencumbered, for some time to get a feeling for the safety of the entrance 10. The bird may therefore be less likely to abandon the birdhouse as might occur, for example, if it were to rest at the entrance 10 facing into the tunnel 14, perhaps with its head in the tunnel 14 and, due to a real but perhaps unjustified sense of danger, skittishly take off at the slightest noise or detected movement, never to return.

The perch 54 may also function as a tail brace, whereby a bird which turns to face into the tunnel 14 may push its tail against the end of the perch 54 to provide leverage for pivoting its head and body into the tunnel 14.

Still further, it should be appreciated that the perch 54 in conjunction with the recessed upper tunnel wall 40 will together provide an ideal environment for a bird to cautiously approach the tunnel 14 and minimize the skittishness of the bird by allowing it to maintain a maximum sense of safety as it investigates the entrance 10. Specifically, the bird may readily perch sideways as illustrated, giving it a sense that it may quickly fly away while at the same time giving it a great range of view for approaching danger. Further, the bird may slowly approach the tunnel 14 so that, rather than feeling trapped in the tunnel 14 as it initially begins to peer into and enter the tunnel 14, the recessed top wall 40 will give a sense of freedom of escape because the bird will not feel totally enclosed in its initial investigation at the outer end of the tunnel 14, nor will its vision of external approaching danger be completely blocked.

It should also be appreciated that the support 50 may define a support in which the outer lowest supporting end (i.e., the tip of the perch 54) is at an angle 60 of about 25° to 45° from the bottom of the tunnel 14. In the illustrated embodiment, the outer tip of the perch 54 is advantageously a distance 62 of about 1.25 inch below the bottom of the tunnel 14, making the angle 60 about 30°. Such an orientation allows a bird to rest on the support 50 so that it can comfortably see around it to detect danger (i.e., without being squeezed against the tunnel 14), while also having an outer surface which will allow the bird to conveniently use its tail to force its body into the tunnel 14 when it wishes to do so.

An alternative form of the present invention is illustrated in U.S. Ser. No. 29/211,369, wherein rather than a distinct stepped support as included in the first illustrated embodiment, all or part of the lower lip of the entrance may extend not only outwardly but also taper downwardly to itself define such a support. (The full disclosure of U.S. Ser. No. 29/211,369, filed Aug. 13, 2004 by the inventor hereof, is hereby fully incorporated by reference). Such a downward taper is not only amenable to providing aesthetically appropriate (naturally looking) configurations, but it also provides a good foothold for a bird to position its body and head to see into the tunnel. It similarly will provide good leverage for the bird (both through its legs and its tail) to push its head and body forward into the entrance when the bird becomes comfortable enough to proceed in that manner.

Moreover, such a downwardly tapered lip may have circumferentially oriented ribs or ridges, for example swirling around the bottom of the entrance. These ribs may be reliably grasped by a bird sitting on the lip, with the rib orientation being such as to naturally cause the bird to be positioned facing either away from or directly into the tunnel, and when first landing on the lip generally facing directly into the tunnel. This may naturally draw the attention of the bird to the tunnel and birdhouse to raise the bird's curiosity sufficiently to investigate, and thereafter use, the birdhouse. In any case, the bird will be able to stand outside away from the end of the entrance to investigate the environment and develop a sense of safety before proceeding into the tunnel. Moreover, the orientation of the ribs allows the birds to maintain a firm stance as they push their body into the tunnel, and the bottom of the lip, typically below the ribs which the bird will most likely grasp with its feet, will project outwardly beyond the position of the bird's legs (due to the outward taper), and thereby further facilitate the bird's ability to use its tail to push against the lip bottom to help move its body into the tunnel.

It should further be understood that the bird entrance may advantageously be created with a rustic appearance (i.e., made to appear of natural materials and origin, such as bark and/or leaves), thereby further enhancing the sense of safety which is necessary to attract any bird to approach and investigate the birdhouse though the birdhouse entrance. In the second described embodiment, for example, the lip ribs may be given the shape and color of bark so as to appear as natural growth, though the lip and entire entrance may actually be suitably manufactured from a hard plastic or other suitable material. The generally random nature of bark will, for example, provide the designer with the ability to both give the natural appearance while also providing ribs which are oriented such as desired and described above.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A protective device for limiting access through an opening formed in one wall of a house for small animals or birds comprising:
    an elongated open-ended tubular body having first and second ends and a passage therethrough;
    a securement for securing the first end of the tubular body to the house; and
    a support structure extending downwardly from the second end of the tubular body, said support structure including a perch substantially aligned with said tubular body and extending at least about 0.75 inches from said second end of the tubular body, said perch being about 1.25 inches below the bottom of said tubular body.

2. The protective device of claim 1, wherein the top of said second end of said tubular body is recessed toward said first end.

3. The protective device of claim 2, wherein the top of said second end of said tubular body is recessed toward said first end by about 0.25 inch.

4. The protective device of claim 1, wherein said tubular body is generally cylindrical in cross-section.

5. The protective device of claim 1, wherein said tubular body has length sufficient to impede access to the interior of the enclosure of creatures too large to pass through said tubular body passage.

6. The protective device of claim 1, wherein said tubular body passage corresponds generally to the shape and dimension of the wall opening in the house.

7. A protective device for limiting access through an opening formed in one wall of an enclosure for small animals or birds comprising:
    an elongated open-ended tubular body having first and second ends and a passage therethrough;
    a securement for securing the first end of the tubular body to the enclosure wall; and
    a support structure extending downwardly and outwardly from the second end of the tubular body, wherein the top of said tubular body above said second end from which said support structure extends is recessed toward said first end.

8. The protective device of claim 7, wherein the top of said second end of said tubular body is recessed toward said first end by about 0.25 inch.

9. The protective device of claim 7, wherein said tubular body is generally cylindrical in cross-section.

10. The protective device of claim 7, wherein said tubular body has length sufficient to impede access to the interior of the enclosure of creatures too large to pass through said tubular body passage.

11. The protective device of claim 7, wherein said tubular body passage corresponds generally to the shape and dimension of the wall opening in the enclosure.

12. A protective device for limiting access through an opening formed in one wall of a house for small animals or birds comprising:
    an elongated open-ended tubular body having a house end and an outer end and a passage therethrough, wherein the top of said outer end of said tubular body is recessed toward said house end;
    a securement for securing said house end of the tubular body to the house; and
    a support structure extending downwardly and outwardly from the outer end of the tubular body, said support structure including a lower outer end which is at least about 25° from vertical relative to a vertical plane from the outer end of the bottom of the passage.

13. The protective device of claim 12, wherein the top of said outer end of said tubular body is recessed toward said house end by about 0.25 inch.

* * * * *